Aug. 8, 1961   M. RICHARDSON   2,995,340
BALE OPENING TOOL
Filed July 17, 1959
FIG. 1
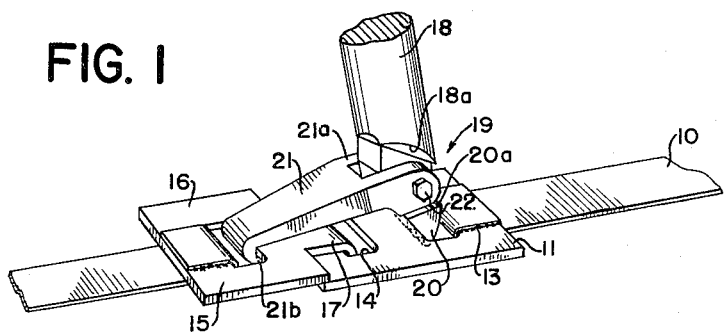
FIG. 2
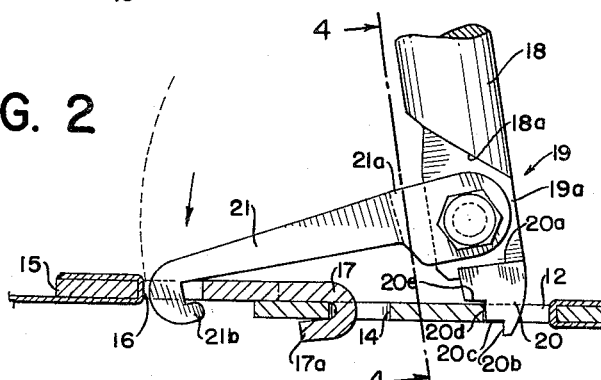
FIG. 4
FIG. 3
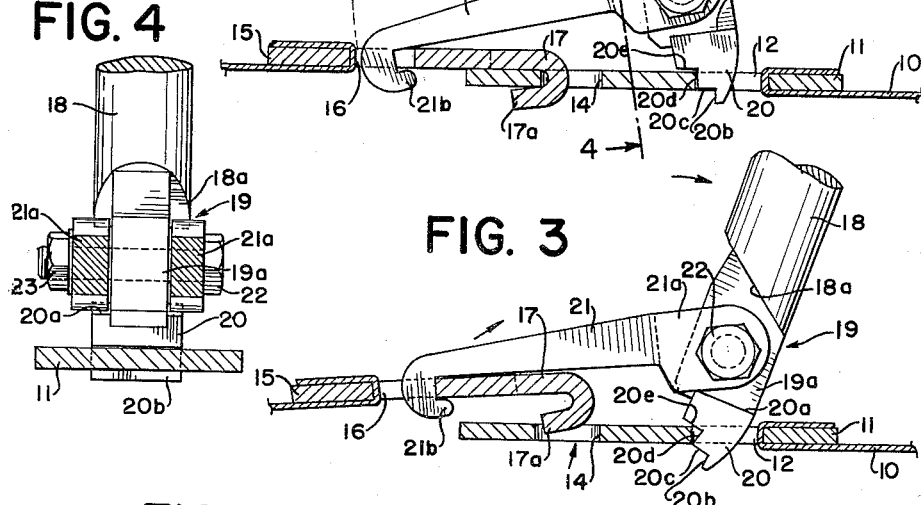
FIG. 5
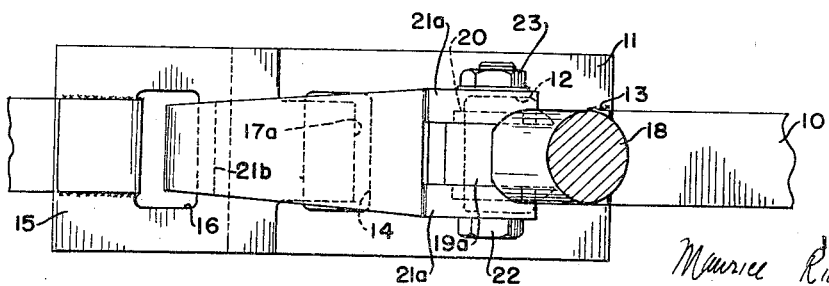
INVENTOR
Maurice Richardson
BY
Pennie Edmonds Morton Barrows Taylor
ATTORNEYS United States Patent Office 2,995,340
Patented Aug. 8, 1961

2,995,340
BALE OPENING TOOL
Maurice Richardson, Amsterdam, N.Y., assignor to Mohasco Industries, Inc., Amsterdam, N.Y., a corporation of New York
Filed July 17, 1959, Ser. No. 827,918
7 Claims. (Cl. 254—79)

This invention relates to tools for opening bands employed for confining bales of material and is concerned more particularly with a novel tool, by the use of which the fastening means of bale bands of the strap type can be readily separated without damage so that the bands can be used again. The new tool is of simple inexpensive construction and its use does not require any considerable skill or strength.

At present, many commodities are shipped in bales, examples of typical materials so handled being wool, cotton, and other fibers. The bales are formed by compressing the material and the material is held compressed by means of bands which encircle the bale and are usually steel straps of suitable length having fastening means at their ends. A common form of fastening means for such a band includes a pair of plates a litle wider than the strap, the plates being attached to respective ends of the strap. One plate has a hook at its free end and the other has an opening for receiving the end of the hook and the bands are fastened in place about a bale, while the bale is under compression, and are then made taut when the bale is released and expands. At it is difficult by means of ordinary tools to tighten a band in place on a bale to the extent necessary to permit the hook to be released from the opening, it has been a common practice to open bales by cutting the bands. A band so cut is incapable of further use, so that the cutting of bale bands to open bales is an expensive procedure.

The present invention is directed to the provision of a simple tool for opening bale bands, by which the fastening plates at the ends of the band can be engaged and drawn toward each other by swinging the tool about one end as a center. In so moving the plates, the tool simultaneously lifts the hook out of the opening, so that, by swinging the tool first in one direction and then in the other, the fastening means on the band are separated and the band can be removed from the bale without being damaged.

For a better understanding of the invention, reference may be made to the accompanying drawing, in which FIG. 1 is a view in perspective showing the new tool in position for opening a bale band;

FIG. 2 is a view in longitudinal section through the fastening means of the bale band with the tool shown in elevation in position to start the opening operation;

FIG. 3 is a view similar to FIG. 2 showing the fastening means on the band separated by the tool;

FIG. 4 is a sectional view on the line 4—4 of FIG. 2; and

FIG. 5 is a plan view of the tool and fastening means as shown in FIG. 3.

The bale bands with which the new tool is to be used, comprise a metal strap 10 of suitable width and of a length dependent upon the size of the bale. A fastening plate 11 is attached to the strap at one end and, for this purpose, the plate is formed with a transverse oblong opening 12 and an end of the strap is passed through the opening and bent back upon itself, so that the strap lies in contact with the opposite faces of the plate. The strap is then secured to the plate in any convenient manner, as by welding, as indicated at 13. The plate 11 has a second transverse oblong opening 14 adjacent its free end. The other end of the strap is provided with a hook plate 15 having a transverse oblong opening 16 through which an end of the strap is inserted, bent back upon itself, and secured in place as previously described. At its free end, the plate 15 has an extension 17 narrower than the plate and the end section 17a of the extension is reversely bent to form a hook which can be inserted in opening 14 to connect the plates and the ends of the strap together. When a band of the construction described has been fastened about a compressed bale and the bale is released from compression, the expansion of the bale makes the band taut and the band can only be opened by moving the plates toward each other to an extent sufficient to permit the hook 17a to be released from the opening 14. The tool of the invention makes it possible to shorten such a band without difficulty and, in the use of the tool, the hook 17a is automatically moved out of its opening 14 in plate 11.

The new tool comprises a rod 18 preferably made of steel and about 2′ long and circular in cross-section with a diameter of about ¾″. Near one end, the rod is cut away to form a neck 19, which has flat parallel sides 19a and may be about ½″ thick. The width of the neck is not substantially less than the diameter of the rod and, at the inner end of the neck, the rod is formed with shoulders 18a which lie at an angle to the axis of the rod .

At its end outwardly from the neck, the rod is formed as a block 20 of a thickness substantially equal to the diameter of the rod and of a width somewhat less than the width of the neck. With the block thicker than the neck, the inner end of the block forms shoulders 20a lying transverse to the axis of the rod. At one side of its outer end, the rod is formed with transverse stepped surfaces 20b, 20c, 20d, 20e, of which surfaces 20b and 20d extend axially of the rod and surfaces 20c and 20e lie normal to the axis of the rod.

A hook 21 is pivotally secured to the neck of the rod and, for this purpose, the hook is formed with a forked end, the legs 21a of which straddle the neck. A bolt 22 passed through openings through the neck and the legs 21a serves as a pivot for the hook and is held in place by a nut 23. The hook 21 has a reversely turned end section 21b at its outer side, that is, the side nearer to the block 20, at the end of the rod.

In the use of the tool, the end of the block 20 is inserted through the opening 12 of the plate 11 so that one of the surfaces 20c or 20e lies against the top of the plate and the adjacent surface 20b or 20d lies against the outer end wall of the opening. The rod is then swung counterclockwise as shown in FIG. 2, so that the section 21b of the hook 21 can be passed through the opening 16 of the hook plate 15. The surfaces 20b, 20d lie at different distances from the end of the end section 21b of the hook 21 and are provided to permit the use of the tool with bands varying somewhat in length or having plates and hooks, which vary in size or have become bent in use. When the hook 21 of the tool has engaged the outer wall of the opening 16 in plate 15, the tool is swung clockwise about the outer wall of opening 12 in plate 11 as a fulcrum to the position shown in FIG. 3. In the initial part of such movement, the hook 21 engages the outer wall of opening 16 in plate 15 and the plates are moved toward each other along substantially parallel paths with the hook swinging on its pivot during the movement. After swinging through a small arc, the hook 21 engages the shoulders formed by the inner ends 20a of the block 20 and, thereafter as the rod swings, the movement of the hook has an upward component. Such movement of the hook occurs when the end section 17a of the hook 17 on the hook plate is in full registry with the opening 14 and the upward movement of hook 21 lifts the hook 17 out of the opening 14. As soon as the plates are disengaged, the tool is swung back counterclockwise and the band is released.

In order that the tool may be operated to raise the hook 17a on the extension 17 of the plate 15 out of the opening 14 in the plate 11, the bolt 22 forming the pivot for the hook 21 should be placed substantially in line with the block 20 axially of the rod 18 and so close to the block, that, when the hook is swung outwardly relatively to the rod, the shoulders will act as a stop arresting the outward movement of the hook with the hook defining a substantial angle with the prolongation of the axis of the rod beyond its end. As shown in FIG. 3, the angle is more than 45° and less than 90°, being about 60° for the tool illustrated, and, when the block 20 and the hook 21 of this tool are inserted in the openings 12 and 14, respectively, of the plates 11 and 15 and the tool is swung in the opening direction, the plates are initially moved relatively in their planes, until the hook 17a is free of the plate 11. At this point, further movement of the plates in their planes would cause the hook 17a to strike the inner end wall of opening 14, but the engagement of the shoulders 20a with the hook 21 holds the hook against further movement relative to the rod 18. Accordingly, as the rod is swung farther, the hook 21 is moved upward relatively to the plates and lifts the hook 17a out of the opening 14. As soon as the hook 17a is clear of the plate 11, the rod 18 can be swung back and, since the hook 21 is now free to swing away from the axis of the rod, there is no force acting on the plate 15, which would cause the hook 17a to re-enter the opening 14. The disconnection of the plates is thus easily accomplished.

As will be evident from the foregoing, the opening of a band by means of the new tool is a simple operation and, because of the long lever arm provided by the rod, little strength is required in shortening the band until its fastening devices can be operated. The formation of the end of the rod as a block providing shoulders limiting the swinging movement of the hook 21 in one direction relative to the rod causes the movement of the rod not only to bring the hook 17 on hook plate 15 into position for removal from the opening in plate 11 but also to raise the hook 17 automatically from the opening. The release of the fastening means is thus carried out in a continuous operation and wholly by means of the tool. The tool also may be used to tighten the bale band about the object to assist in fastening the fastening means if desired.

I claim:

1. A tool for opening bale bands in which one end of the band has a hooked portion that engages a portion of the other end of the band to connect the ends of the band together and secure the band about the bale, which comprises a rod having a laterally-extending shoulder at one end, said one end of the rod being adapted to fulcrum on said other end of the bale band, a hook having one end mounted pivotally on the rod inward from the shoulder, the hook having a reversely-extending section at its free end adapted to engage said hooked end of the band, the shoulder acting as a stop to arrest the angular movement of the hook towards the shoulder relative to the rod with a line extending from the pivot to the free end of the hook defining an angle in excess of 45° with the prolongation of the axis of the rod beyond said end of the rod, whereby after the hook has engaged said hooked end of the band, and the rod is swung in a direction to disengage the hooked end of the band from the other end of the band, as said one end of the rod fulcrums on said other end of the band, and thereafter as the rod is swung farther in said direction the shoulder arrests the angular movement of the hook and causes the hooked end of the band to become disengaged from the other end of the band.

2. The tool of claim 1 in which said end of the rod has offset, transversely-extending pairs of surfaces outward from the pivot lying at different distances from the axis of the rod, one surface of said pair being substantially parallel to the axis of the rod and the other surface of said pair being at an angle to the first.

3. A tool for opening bale bands, which comprises a rod having parallel flat longitudinally-extending surfaces inward from and adjacent one end, a hook having a forked end straddling said surfaces and mounted pivotally on the rod, a block protruding from each of the parallel flat surfaces, the surfaces of the blocks nearest the pivotal mounting forming shoulders acting as stops limiting the swinging movement of the hook towards the shoulder relative to the rod with a line extending from the pivot to the free end of the hook defining an angle in excess of 45° with the prolongation of the axis of the rod beyond said end of the rod.

4. The tool of claim 3, in which the rod has a relatively thin section forming a neck between said parallel flat surfaces.

5. A tool for opening bale band fastening means of the type which comprises two fastening plates, one of said fastening plates being attached to one end of the bale band and having a first opening, the other fastening plate being attached to the other end of the bale band and having a hooked portion to pass through said first opening and to engage said first-mentioned fastening plate to secure the bale band; said tool comprising a rod, a hooked member pivotally attached to said rod adjacent one end thereof, said end of the rod being shaped to engage in a second opening in said first-mentioned fastening plate, the free end of said hooked member having a hooked portion adapted to pass through an opening in said second-mentioned fastening plate and to engage said second-mentioned fastening plate, stop means on said end of the rod arresting the swinging movement of the hooked member towards the shoulder relative to the rod with a line extending from the pivot to the free end of the hook defining an angle in excess of 45° with the prolongation of the axis of the rod beyond said end of the rod.

6. The tool of claim 5 in which said end of the rod has a plurality of fastening plate engaging portions spaced at different distances from the pivotal attachment of the hooked member.

7. The tool of claim 5 in which said angle is greater than 45° and less than 90°.

References Cited in the file of this patent

UNITED STATES PATENTS

| | | |
|---|---|---|
| 427,304 | Eagan | May 6, 1890 |
| 491,728 | Miller | Feb. 14, 1893 |
| 530,361 | Smith et al. | Dec. 4, 1894 |
| 1,975,773 | Davis | Oct. 9, 1934 |